UNITED STATES PATENT OFFICE.

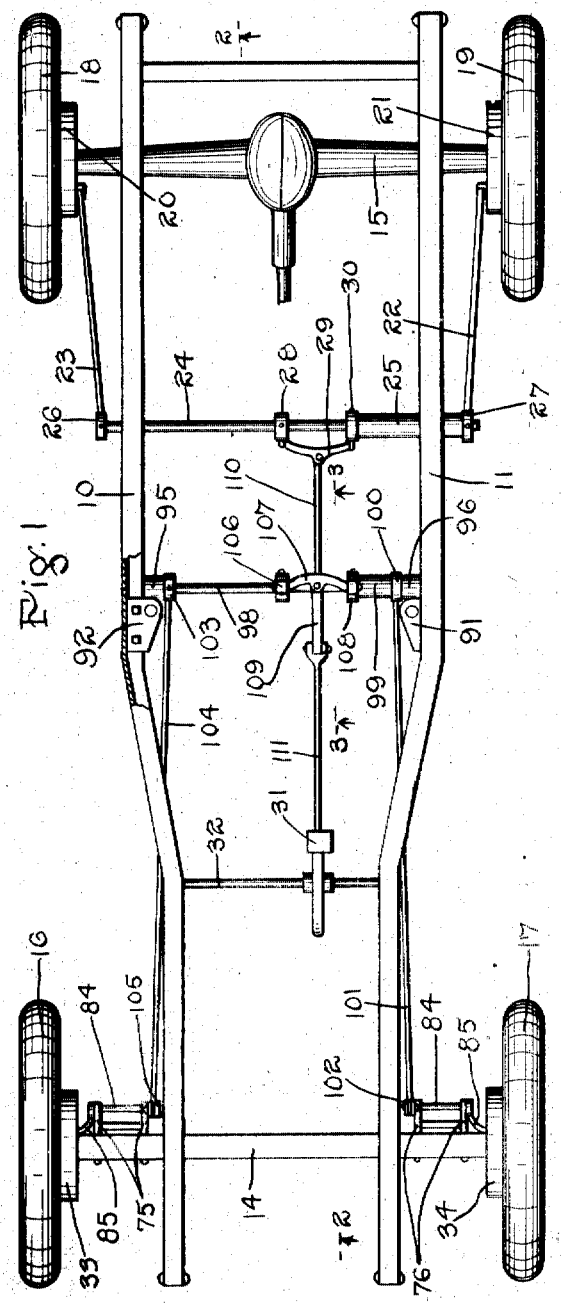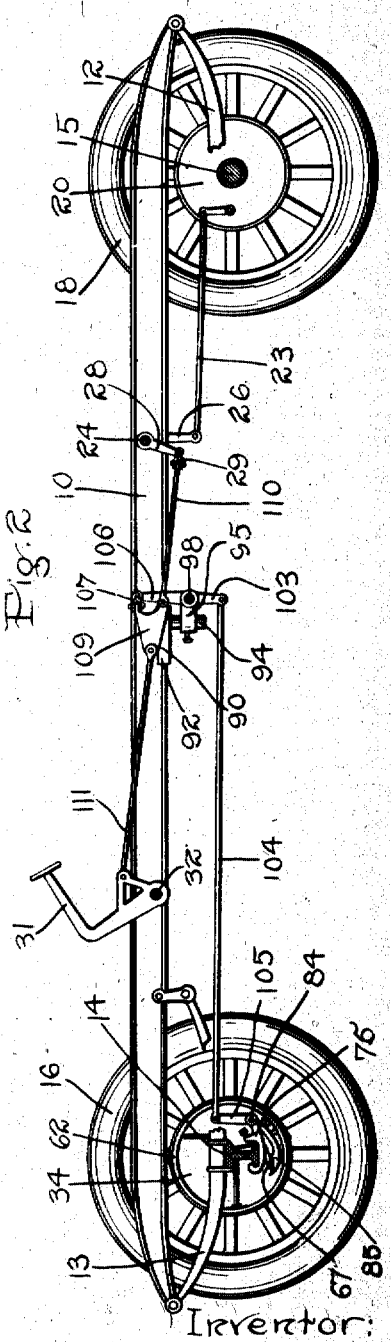

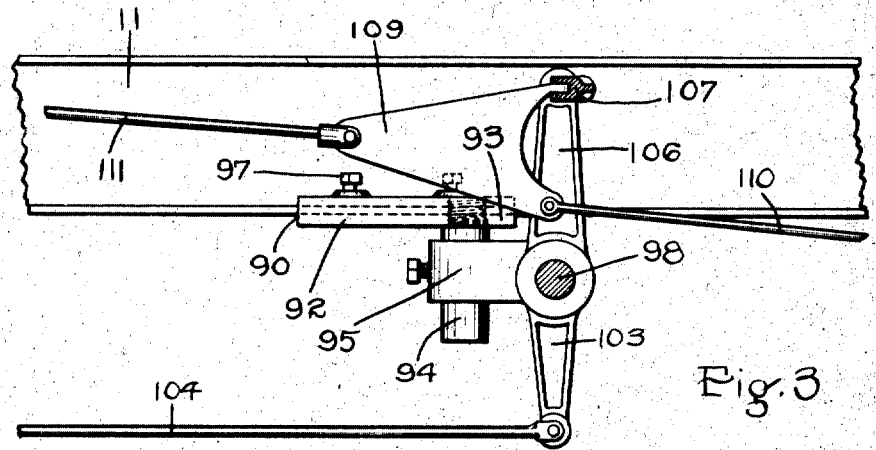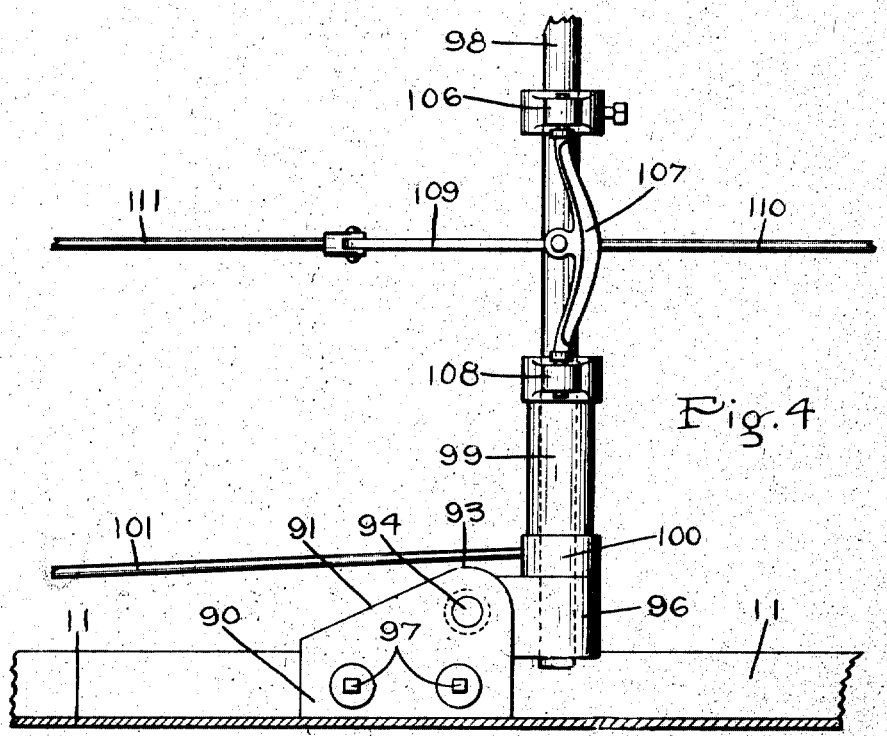

HAROLD S. MORTON, OF MINNEAPOLIS, MINNESOTA, ASSIGNOR TO MORTON BRAKE COMPANY, OF MINNEAPOLIS, MINNESOTA, A CORPORATION OF MINNESOTA.

VEHICLE-BRAKE.

1,278,981.　　　Specification of Letters Patent.　　Patented Sept. 17, 1918.

Application filed July 12, 1916. Serial No. 108,872.

*To all whom it may concern:*

Be it known that I, HAROLD S. MORTON, a citizen of the United States, residing at Minneapolis, in the county of Hennepin and State of Minnesota, have invented certain new and useful Improvements in Vehicle-Brakes, of which the following is a specification.

My invention relates to vehicle brakes, particularly brakes for application to all four wheels of a power-driven vehicle such as an automobile, and has for its object to provide a novel equalizer mechanism, with means for adjustably supporting the same on the automobile or vehicle, such that in case one of the brake rods should break the remaining brakes, whether one or three, would nevertheless be effectively set.

The full objects and advantages of my invention will appear in connection with the detailed description thereof and are particularly pointed out in the claims.

In the drawings, illustrating the application of my invention in one form,—

Figure 1 is a plan view of an automobile frame and wheels showing the application of my invention. Fig. 2 is a sectional elevation view taken on line 2—2 of Fig. 1. Fig. 3 is an enlarged sectional elevation view of the equalizer shown in Figs. 1 and 2 taken on lines 3—3 of Fig. 1. Fig. 4 is an enlarged plan view of mechanism shown in Fig. 3.

My invention is most easily applied to automobiles and is shown in conjunction with an automobile having the usual rear wheel brakes and also having front wheel brakes, as is illustrated in Figs. 1 and 2. A pair of longitudinal frame members 10 and 11, provided with springs 12 and 13, support a front axle 14 and a rear axle 15 upon which are journaled, respectively, front steering wheels 16 and 17 and rear driving wheels 18 and 19. The rear wheels 18 and 19 are provided with brakes 20 and 21 operated by brake rods 22 and 23, as is customary. As shown, the front wheels also are provided with brake members 33 and 34, of a special type which are described more in detail in a co-pending application, Serial No. 108,873, filed concurrently herewith. A shaft 24 journaled in the frame members 10 and 11 has secured to it at one end outside of frame member 10 an arm 26 to which is pivoted the rod 23, and has loosely mounted upon the other end a sleeve 25 passing through frame member 11 which is provided with an arm 27 on the outside thereof pivotally connected to the other brake rod 22 and corresponding in position and extent to arm 26. Another arm 28 is secured to shaft 24 near the center thereof and is pivotally connected to an equalizer bar 29, which in turn is pivotally connected to a similar arm 30 secured upon the inner end of the sleeve 25. This arm 28, and by it the equalizer 29, is connected as will hereinafter be pointed out with the usual foot pedal 31 mounted on a shaft 32 journaled in the frame members 10 and 11 toward the front of the vehicle.

Without going into detail as to the character of the front wheel brake mechanism, it may be said that the drums 33 or 34 are engaged on the inside by a brake band 62 which is operated by an arm 67. In double-armed castings 75, 76, secured to front axle 14, are journaled shafts 84 having fast thereon arms 85 which engage the arms 67 for actuating the front brake bands 62 in a manner which need not be here described.

The arrangement of brake-actuating and equalizer mechanism whereby the several brakes may be simultaneously and equalizingly set, even though one of the brake rods should be disconnected or broken, is as follows: A pair of castings 91 and 92, shown in Fig. 1, and in detail in Figs. 3 and 4, in part support this mechanism. These castings each comprise bifurcated base portions 90 which clasp the lower flange of the respective frame members 10 and 11 and which are held in place thereon by a pair of setscrews 97 screwed therein. Ear 93 formed integral with said base has screwed in it a suspending rod or support 94. A pair of bearings 95, 96 are adjustably mounted upon the support 94 and have journaled therein a transverse shaft 98 which extends across the vehicle frame. Loosely mounted on one end of the shaft 98 is a sleeve 99 which has secured to its end adjacent the bearing 96 a depending arm 100 connected by a link 101 to an upwardly-extending arm 102 fast on the shaft 84, operating the brake on wheel 17. A depending arm 103, similar to arm 100, is secured to the shaft 98 near the opposite end thereof and is connected by a link 104 to an arm 105 on the shaft 84 operating the brake on wheel 16. Shaft 98 has secured to it near the center thereof an upstanding arm 106, which is pivotally connected at one end to an equalizer bar 107, said bar in turn being pivotally connected to a similar arm 108 on the end of sleeve 99.

A triangular connector plate 109, which serves as a central equalizer between the two sets of brakes, is pivoted at one point to the equalizer bar 107 and is pivotally connected at another point below said equalizer bar by means of a link 110 with the central portion of equalizer 29 controlling the rear wheel brakes. A link 111 is pivoted to a forward portion of the equalizer 109 and connects with the foot pedal 31.

The advantages of my invention are very obvious. It will be seen from the above that when the foot pedal 31 is operated the power transmitted through link 111 and equalizer 109 will be in the aggregate equalized between the front and the rear braking members. In turn the power going to the front or rear wheels will be equalized between the pairs of wheels. It follows from this that if the connecting rod 110 were to break, or any of rods 22, 23, 101, 104 were to break, that the power would nevertheless be transmitted to the remaining connecting brakes, equalizer plate 109 merely shifting in position in case rod 110 were to break. There would, therefore, be only one rod or link which could break so as to render the brakes inoperative, and that is the short main link 111, which can be made strong enough to offset any breaking tendency.

I claim:

1. In combination with the frame of a vehicle and two sets of brakes mounted thereon, means for operating said brakes including an equalizer for each set of brakes, an actuating lever, a triangular plate constituting a third equalizer, a connection from each of the first two equalizers with an apex of said triangular plate, and a connection from said lever with the remaining apex of said plate.

2. In combination with the frame of a vehicle and two sets of brakes mounted thereon, means for operating said brakes including an equalizer for each set of brakes, an actuating lever operative in a plane vertical to the plane of the frame, a triangular plate constituting a third equalizer operative in the plane of the lever, a connection from each of the first two equalizers with an apex of said triangular plate, and a connection from said lever with the remaining apex of said plate.

3. In combination with the frame of a vehicle and two sets of brakes mounted thereon, means for operating said brakes including an equalizer for each set of brakes, an actuating lever, a third equalizer, and connections from each of the first two equalizers and the lever with said third equalizer, the three points of connection forming an isosceles triangle having a short side joining the points of connection for the first two equalizers and said side being substantially at right angles to the long axis of the vehicle frame.

4. In combination with the frame of a vehicle and two sets of brakes thereon, a shaft extending transversely of the vehicle for each set of brakes, a sleeve on each shaft, means connecting a brake of each set with its shaft, means connecting a brake of each set with the corresponding sleeve, equalizers connecting the shaft and sleeve of each brake set, a third equalizer operative in a plane transverse to the plane of the first-named equalizers and pivotally connected at separated points in said transverse plane with said first-named equalizers, and a single actuating lever having operative connection with the third equalizer.

5. In combination with the frame of a vehicle and front wheel and rear wheel brakes thereon, means for operating said respective sets of brakes including an independent equalizer for each set of brakes operative in the horizontal plane, a third equalizer connected with each of said first-named equalizers at separated points in a vertical plane, and a single actuating lever having a unitary connection therefrom to said third equalizer at a point spaced from and in the same plane of the points of connection of the first-named equalizer.

6. In combination with the frame of a vehicle and two sets of brakes thereon, a shaft extending transversely of the vehicle for each set of brakes, a sleeve on each shaft, one of said shafts and sleeves being mounted for vertical adjustment, means connecting a brake of each set with the corresponding shaft, means connecting a brake of each set with the corresponding sleeve, equalizers connecting the shaft and sleeve of each brake set, a third equalizer adjacent the adjustable shaft and sleeve and pivotally connected with said first-named equalizers at separated points in a plane vertical to said shafts, and a single actuating lever having operative connection with the third equalizer at a point in the same plane with but separated from the points of connection of the first-named equalizers.

7. In combination with the frame and brakes of a vehicle and means for operating said brakes including a shaft mounted transversely of said frame and equalizers supported on and associated with said shaft, means holding said shaft so as to permit adjustment of the shaft bodily in a vertical position relative to said frame.

8. In combination with the frame and brakes of a vehicle and means for operating said brake including a shaft mounted transversely of said frame and equalizers supported on and associated with said shaft, a wheel, and means between the other of said rings and the frame plate to force the last mentioned ring against said disk and the latter against the farther ring.

3. A brake for motor vehicles comprising the combination, with the wheel, of an annular disk connected to rotate with said wheel but free to move axially, studs carried by the wheel and projecting through said disk, a pair of outer friction rings flanking said disk outside said studs and a pair of inner friction rings flanking said disk within said studs, means to support said pairs of rings from a stationary part of the vehicle, and independent means between a stationary part and one of each pair of said rings to force said ring against said disk and the latter against the other ring of that pair.

4. A brake for motor vehicles comprising the combination, with the wheel, of flanged plates connected to said wheel and to the frame respectively, the flange of one plate overlapping that of the other so as to form a casing for the brake, studs projecting from the wheel plate into said casing, an annular disk slidably supported on said studs, bolts projecting from the frame plate into said casing, friction rings mounted on said bolts on each side of said disk, and means, under the control of the operator, to force said rings and disk into contact.

5. A friction brake comprising the combination with a driven shaft and a frame member in which the same is mounted, of flanged plates on said shaft and frame member, respectively, the flanges extending in opposite directions from said plates so as to form a casing, annular friction disks within said casing, one or more of which is connected to rotate with said shaft, the others being non-rotatably carried by the frame, and means connected to said frame member and bearing on the adjacent non-rotatable disk to force the latter away from said member and apply the brake.

6. A friction brake comprising the combination with a driven shaft and a stationary part, of a rotary friction member secured to said shaft, a non-rotatable friction member supported by said stationary part so as to be movable axially, means to hold said rotary member against axial movement away from said non-rotatable member, a cam disk supported by said stationary part so as to have a limited turning movement, cam surfaces on the face of said disk whereby, when it is turned in one direction, it is forced against the back of said non-rotatable member, and manual means for turning said disk.

7. A double friction brake for motor vehicles and the like, comprising the combination with the fixed rear axle, the driving shaft therein, and the wheel connected to said shaft, of flanged plates connected to the wheel and to the axle respectively so as to form an inclosing housing, a circular set of studs projecting inwardly from the wheel plate, two circular sets of bolts projecting inwardly from said axle plate, a friction disk slidably supported on said studs, independent pairs of friction rings, those of each pair being on opposite sides of said disk, slidably mounted on said bolts, nuts on the inner ends of said bolts to resist the thrust on said rings, means mounted between the axle plate and the nearer of the outer pairs of rings to force the latter against said disk, connections whereby said means is actuated by a foot pedal, similar means between said plate and the nearer of the inner pair of rings to force the latter against said disk, and connections whereby said last mentioned means is actuated by a hand lever.

In testimony whereof I have hereunto set my hand.

WILLIAM W. ROACH.